(12) United States Patent
Nakaya

(10) Patent No.: US 11,306,763 B2
(45) Date of Patent: Apr. 19, 2022

(54) NUT

(71) Applicant: NAKAYA SEISAKUSHO CO., LTD., Yokohama (JP)

(72) Inventor: Takayoshi Nakaya, Yokohama (JP)

(73) Assignee: NAKAYA SEISAKUSHO CO., LTD., Yokohama (JP)

( * ) Notice: Subject to any disclaimer, the term of this patent is extended or adjusted under 35 U.S.C. 154(b) by 0 days.

(21) Appl. No.: 16/641,792

(22) PCT Filed: Sep. 18, 2019

(86) PCT No.: PCT/JP2019/036479
§ 371 (c)(1),
(2) Date: Nov. 6, 2020

(87) PCT Pub. No.: WO2021/053743
PCT Pub. Date: Mar. 25, 2021

(65) Prior Publication Data
US 2021/0254653 A1 Aug. 19, 2021

(51) Int. Cl.
*F16B 39/00* (2006.01)
*F16B 37/08* (2006.01)
*F16B 21/18* (2006.01)

(52) U.S. Cl.
CPC ........ *F16B 37/0828* (2013.01); *F16B 21/183* (2013.01)

(58) Field of Classification Search
CPC . F16B 37/0864; F16B 21/183; F16B 37/0828
USPC .......................................... 411/259, 443, 434
See application file for complete search history.

(56) References Cited

U.S. PATENT DOCUMENTS

| | | | | |
|---|---|---|---|---|
| 2,384,953 A | * | 9/1945 | Miller | F16B 39/36 411/237 |
| 3,334,536 A | * | 8/1967 | Armstrong | F42B 3/006 411/434 |
| 3,352,341 A | * | 11/1967 | Schertz | F16B 37/0864 411/270 |
| 4,930,961 A | * | 6/1990 | Weis | F16B 37/0864 411/266 |
| 4,941,790 A | * | 7/1990 | Kirn | B27B 5/32 411/432 |

(Continued)

FOREIGN PATENT DOCUMENTS

| | | |
|---|---|---|
| DE | 717229 C1 | 2/1942 |
| GB | 558302 A | 12/1943 |
| JP | 47-20530 B1 | 6/1972 |

*Primary Examiner* — Gary W Estremsky
(74) *Attorney, Agent, or Firm* — Muncy, Geissler, Olds & Lowe, P.C.

(57) ABSTRACT

This nut (1) comprises a nut main body (3) having a substantially cylindrical shape and constituted by a plurality of nut segments (3a), an outer cover (4), a restraining ring (5), an inner cover (6) comprising a restraining plate (6a) at one end portion of the inner cover (6) and serving to cover an outer circumference of the nut main body (3), and a ring-shaped spring (7) serving to bias the nut main body (3) to cause the nut main body (3) to expand radially. Protrusions (8) protruding in a circumferential direction are formed on an inner surface of the inner cover (6). Grooves (9) are formed on an outer surface of the nut main body. The protrusions (8) and the grooves (9) have slant surfaces (10) that contact each other on the same side in the axial direction.

2 Claims, 5 Drawing Sheets

(56) References Cited

U.S. PATENT DOCUMENTS

| | | | | |
|---|---|---|---|---|
| 5,118,237 A * | 6/1992 | Wright | ................... | F16B 31/02 411/14 |
| 5,378,100 A * | 1/1995 | Fullerton | ............ | F16B 37/0857 411/267 |
| 5,631,816 A * | 5/1997 | Brakus | .............. | H02M 3/33507 363/56.1 |
| 6,033,169 A * | 3/2000 | Bettger | ............... | F16B 37/0857 411/267 |
| 6,290,446 B1 * | 9/2001 | Warkotsch | ............ | G01M 1/045 411/433 |
| 6,361,260 B1 * | 3/2002 | Schirrmacher | ..... | F16B 37/0857 411/267 |
| 6,974,291 B2 * | 12/2005 | Li | ....................... | F16B 37/0864 411/267 |
| 2010/0021265 A1 * | 1/2010 | Parks | ................... | F16B 31/005 411/434 |

* cited by examiner

NUT

TECHNICAL FIELD

The present invention relates to a nut that can be passed along and fastened together with a bolt with ease.

BACKGROUND ART

A bolt in which threads are formed on an outer circumference of a long rod-like member is known. A nut, on the other hand, has a shape of a substantially flat plate and is cylindrical, and has threads formed on an inner circumference thereof. The nut is screwed onto the bolt, and the nut and the bolt are used as a bolt-nut set in a variety of construction sites, and the like. To present an example, a member is passed along the bolt and nuts are screwed from both sides of the member so that the member is held by the nuts and fixed. In such a case, the nuts are moved up to the position of the member while being screwed. In other words, each nut can be moved along the long nut as a result of being screwed from one end portion of the bolt.

When the bolt is long, however, it requires considerable effort and is troublesome to move the nut along the bolt while screwing the same. In this regard, it is known to divide a nut to allow the nut to slide along a bolt, thereby facilitating nut movement (see, for example, Patent Document 1).

RELATED ART DOCUMENTS

Patent Documents

Patent Document 1: Japanese Unexamined Patent Application Publication No. 2002-168222

SUMMARY OF INVENTION

Problem to be Solved by Invention

In a structure such as that disclosed in Patent Document 1, however, where a taper is employed to expand a nut to allow the nut to pass along an outer side of a bolt, the nut can be moved only unidirectionally. So, once the nut is passed in one direction, then if it is desired to move the nut back in the opposite direction from an intermediate position, there is no other choice than to close the nut and move the nut back while screwing the same.

The present invention has been contrived in consideration of the above conventional art, and an objective thereof is to provide a nut that can be bidirectionally passed along a bolt with ease.

Means for Solving the Problem

In order to achieve the above objective, the present invention provides a nut to be fastened onto a bolt, characterized in that the nut comprises a nut main body having a substantially cylindrical shape and constituted by a plurality of nut segments obtained through segmentation of the nut main body in a circumferential direction, an outer cover configured to cover an outer circumference and one end face of the nut main body, a restraining ring configured to abut against the other end face of the nut main body for restricting movement of the nut main body in an axial direction in the outer cover while allowing the nut main body to only expand and contract in a radial direction in the outer cover, an inner cover comprising a restraining plate at one end portion of the inner cover, the restraining plate being configured to restrict a position of the restraining ring, the inner cover being accommodated in the outer cover and configured to cover the outer circumference of the nut main body, and a ring-shaped spring disposed on an inner wall of the nut main body and configured to bias the nut main body to cause the nut main body to expand radially toward an inner wall of the inner cover, wherein a protrusion protruding in a circumferential direction is formed on the inner surface of the inner cover, a groove is formed in a circumferential direction on an outer surface of the nut main body in a manner in which the groove is capable of engaging with the protrusion and accommodating the protrusion, and the protrusion has a slant surface and the groove has a slant surface, the slant surfaces being configured to contact each other on the same side in the axial direction.

Preferably, the nut main body includes an insertion state constituted by a state in which the nut main body is expanded radially by the ring-shaped spring and the protrusion and the groove are in engagement with each other, an intermediate state constituted by a state in which the protrusion and the groove contact each other only through the slant surfaces and the nut main body contracts radially against the ring-shaped spring, and a fastened state constituted by a state in which a leading end of the protrusion is in abutment against an outer wall surface of the nut main body except for the groove and the nut and the bolt are fastened together, and a transition between the insertion state, the intermediate state, and the fastened state is made as a result of the inner cover moving in the axial direction.

Effect of Invention

According to the present invention, the nut main body is biased radially outward by the ring-shaped spring. Thus, the bolt and the nut main body do not interfere with each other when the bolt is inserted through the nut. Accordingly, the nut is freely movable along the bolt bidirectionally and can be easily passed along the bolt bidirectionally. When the nut and the bolt are to be fastened together, the protrusion may be removed from the groove along the slant surface and made to press against the outer wall surface of the nut main body so that the nut and the bolt mesh with each other, and in this state, the nut and the bolt may simply be screwed together.

Moreover, the transition between the insertion state, the intermediate state, and the fastened state can be made through mere movement of the inner cover, so the nut can be passed and fastened easily by a simple operation. Consequently, work efficiency at a work site is improved and speedy work can be achieved.

BEST MODE FOR CARRYING OUT THE INVENTION

Figure 1:
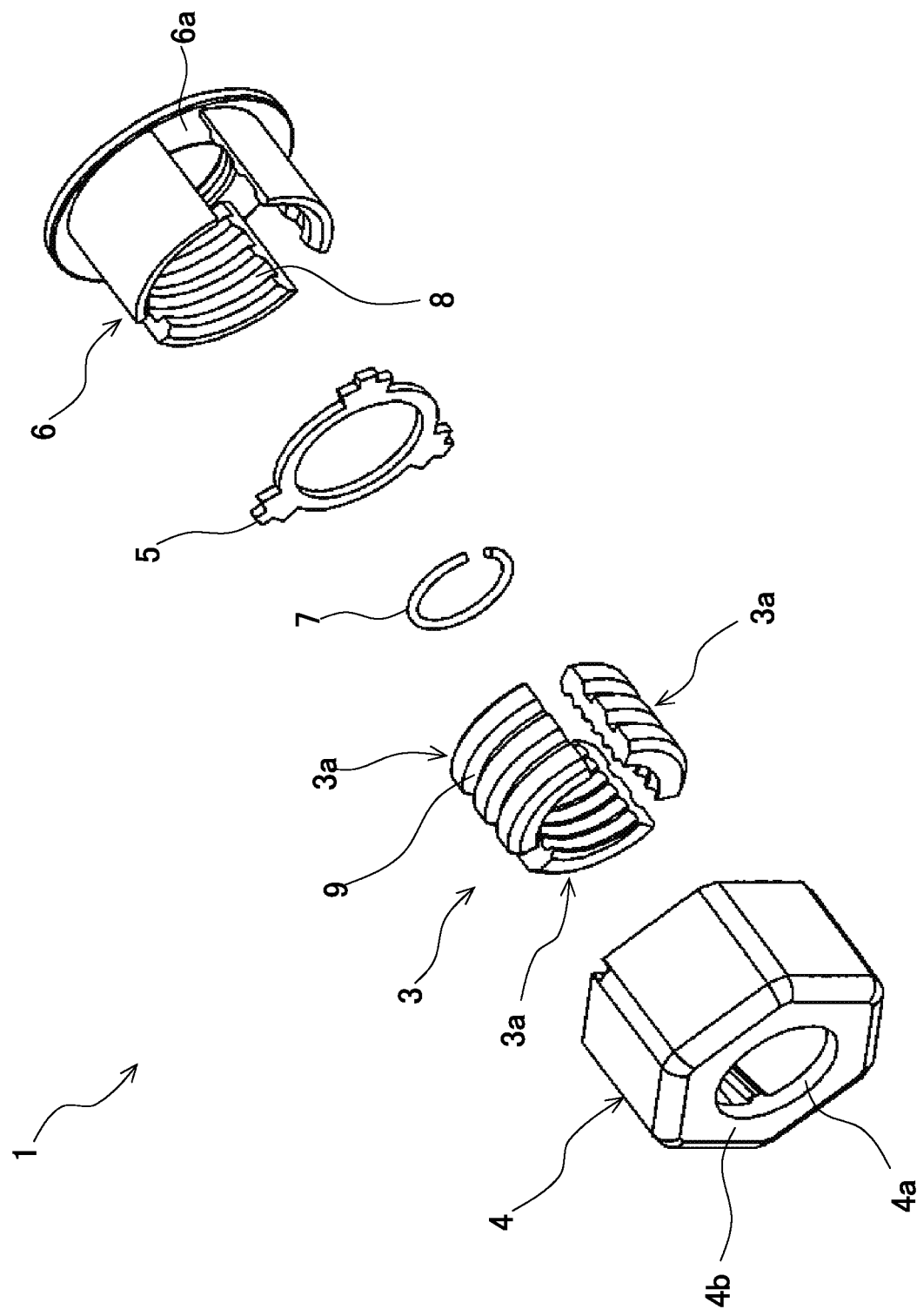
FIG. 1 is a schematic exploded perspective view of a nut according to the present invention.

As illustrated in FIG. 1, a nut 1 according to the present invention is designed to be screwed onto a bolt 2, which will be described later. The nut 1 includes a nut main body 3 having a substantially cylindrical shape. Threads are formed on an inner wall surface of the nut main body 3. The nut main body 3 is constituted by a plurality of (three in the drawing) nut segments 3a obtained through segmentation of the nut main body 3 in a circumferential direction. The adjacent nut segments 3a coming into contact results in the formation of the substantially cylindrical shape. The adjacent nut segments 3a moving away from one another results in the nut main body 3 expanding in a radial direction. The nut main body 3 is covered by an outer cover 4. Specifically, the outer cover 4 covers at least an outer circumference and one end face of the nut main body 3. Accordingly, the outer cover 4 has an outer wall that is continuous in the circumferential direction (in the drawing, the outer wall has an equilateral hexagonal shape in a plan view), and one end face thereof is closed except for the portion in which a through-hole 4a centered on a center axis is formed. In other words, the one end face protrudes from an outer edge toward an inner side and this protruding part functions as a stopper 4b (to be described later).

A restraining ring 5 having a substantially annular shape is accommodated in the outer cover 4. The restraining ring 5 is disposed on the side of the other end face of the outer cover 4 and is in contact with the nut main body 3. As it is evident from FIG. 2, one end face of the nut main body 3 abuts against the stopper 4b of the outer cover 4 and the other end face thereof abuts against the restraining ring 5. The restraining ring 5 serves to restrict movement of the nut main body 3 so that the nut main body 3 does not move in the outer cover 4 in an axial direction. As such, in the outer cover 4, the nut main body 3 is only allowed to expand and contract in the radial direction due to the nut segments moving away and toward one another.

Figure 2:
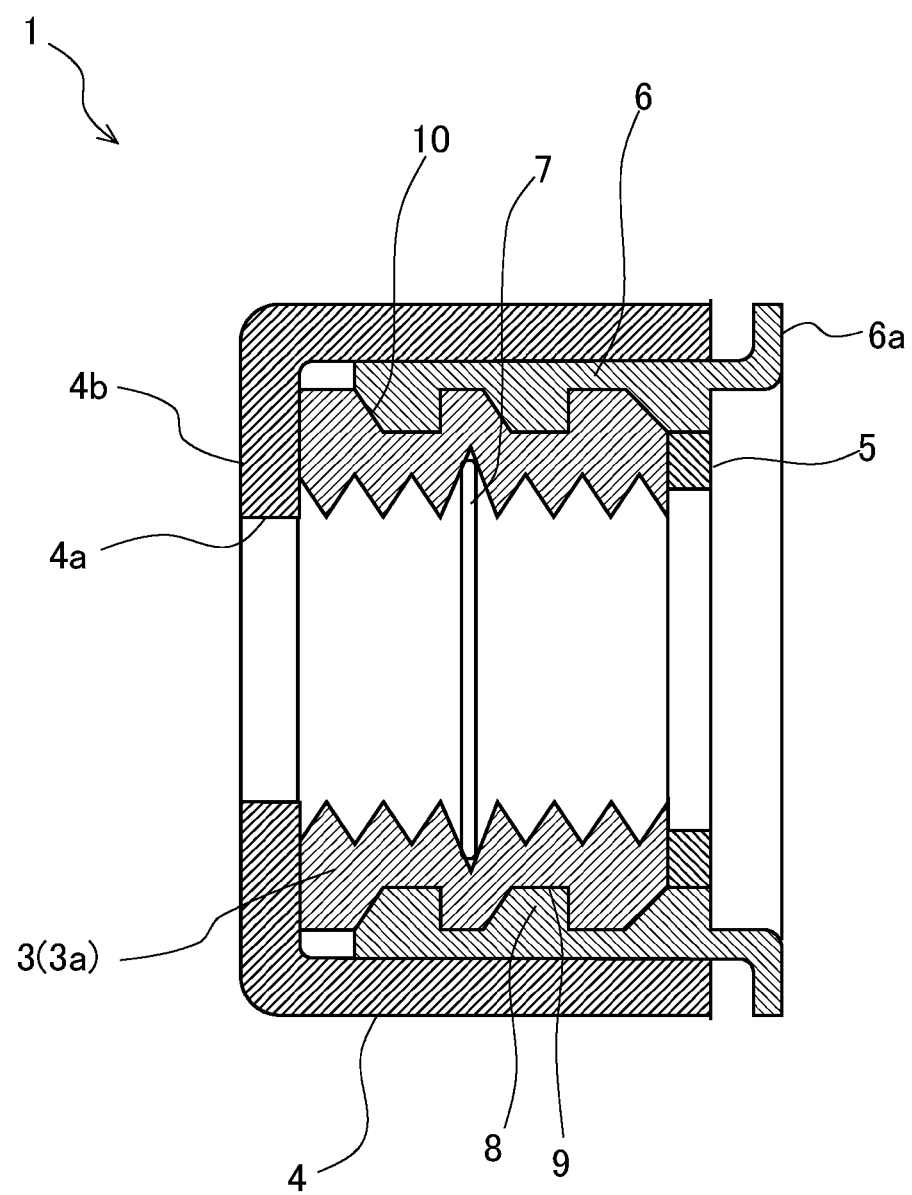
FIG. 2 is a schematic cross-sectional view of the nut according to the present invention.

An inner cover 6 is provided between the outer cover 4 and the nut main body 3. Accordingly, the inner cover 6 is accommodated in the outer cover 4 and covers the outer circumference of the nut main body 3. A restraining plate 6a is formed on one end portion of the inner cover 6 (the end portion thereof on the opposite side from the stopper 4b of the outer cover 4) so as to extend inwardly and outwardly. A position of the restraining ring 5 is restricted by the restraining plate 6a protruding toward the inner side. In FIG. 2, the portion of the restraining plate 6a that protrudes toward the inner side is not illustrated. As has been described above, threads are formed on an inner circumference of the nut main body 3. A ring-shaped spring 7 is fit into the threads (the portion of the threads in which the ring-shaped spring 7 is fit is formed to be deep so that the ring-shaped spring 7 does not become an obstruction when these threads and threads of the bolt 2 are fastened together). In other words, the ring-shaped spring 7 is disposed on the inner wall of the nut main body. The ring-shaped spring 7 serves to bias the nut main body 3 so that the nut main body 3 expands radially toward the inner wall of the inner cover 6. Thus, in a state in which there is no action being performed, the nut main body 3 expands radially to the maximal extent as a result of the nut segments 3a being moved away from each other due to the ring-shaped spring 7. Note that a hole having a diameter that is larger than or equal to the diameter of the through-hole 4a is formed in a central part of the restraining plate 6a.

Protrusions 8 that protrude in continuous fashion in the circumferential direction are formed on an inner surface of the inner cover 6. On the other hand, grooves 9 that are continuous in the circumferential direction are formed on an outer surface of the nut main body 3. The grooves 9 are formed into a size so as to be capable of accommodating the protrusions 8. The protrusions 8 being accommodated in the grooves 9 results in engagement of the protrusions 8 and the grooves 9. As illustrated in FIG. 2, slant surfaces 10 are formed on one side surfaces of the protrusions 8 and the grooves 9. The slant surfaces 10 are in contact with each other in a state in which the protrusions 8 are accommodated in the grooves 9. The slant surfaces 10 are formed on the same side (the stopper 4b side in the drawing) of the protrusions 8 and the grooves 9 in the axial direction.

Figure 3:
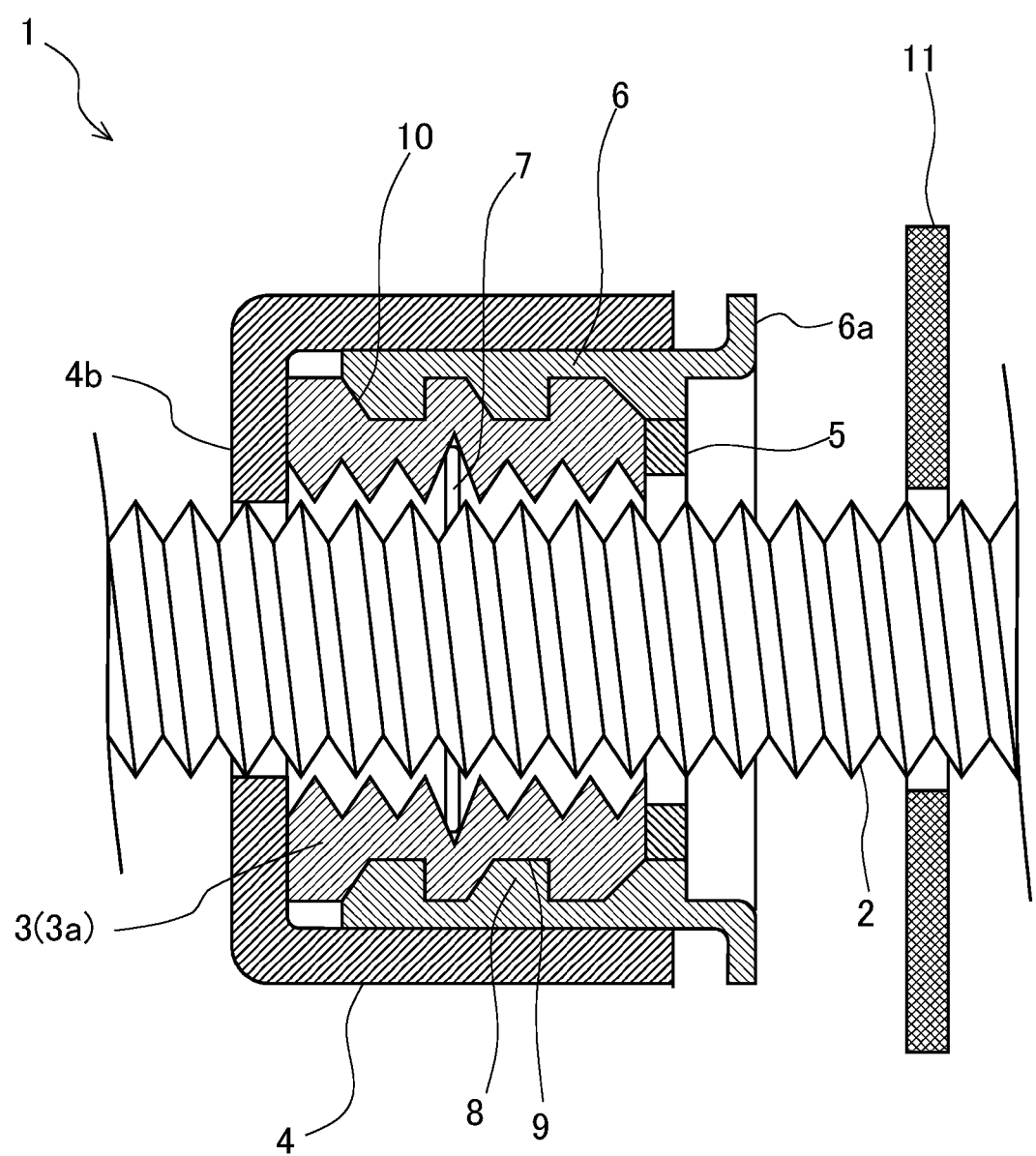
FIG. 3 is a schematic cross-sectional view of an insertion state.

When the nut 1 having such a structure is used to be fastened onto the bolt 2, operations such as the following will take place. As illustrated in FIG. 3, in a state in which the protrusions 8 have completely been accommodated in the grooves 9 (a state in which the protrusions 8 and the grooves 9 have meshed with each other), a state in which the nut main body 3 is radially expanded to the maximal extent due to the ring-shaped spring 7 is established. This state can in other words be expressed as a state in which the restraining plate 6a of the inner cover 6 is distanced to the maximal extent from the other end face (the end face on the opposite side from the stopper 4b) of the outer cover 4. In this state, the threads of the nut main body 3 are located further on an outer side than the through-hole 4a through which the bolt 2 is inserted, i.e. further on an outer side than an outer diameter defined by the threads of the bolt 2 to be inserted. This state illustrated in FIG. 3 is defined as an insertion state. In this state, insertion of the bolt 2 through the nut 1 (movement of the nut 1 along the bolt 2) is free from any obstruction, so the bolt 2 is inserted easily. More specifically, the bolt 2 passes through the inner side of the through-hole 4a, nut main body 3, the ring-shaped spring 7, the restraining ring 5, and the hole formed in the central part of the restraining plate 6a. When, for example, there is a member 11 that is intended to be fixed on the bolt 2 using the nut 1, the nut 1 is moved up to a location where the nut 1 abuts against the member 11. This movement is carried out while either holding the outer cover 4 alone or keeping the distance between the outer cover 4 and the inner cover 6 (by pinching the two with fingers, for example).

Figure 4:
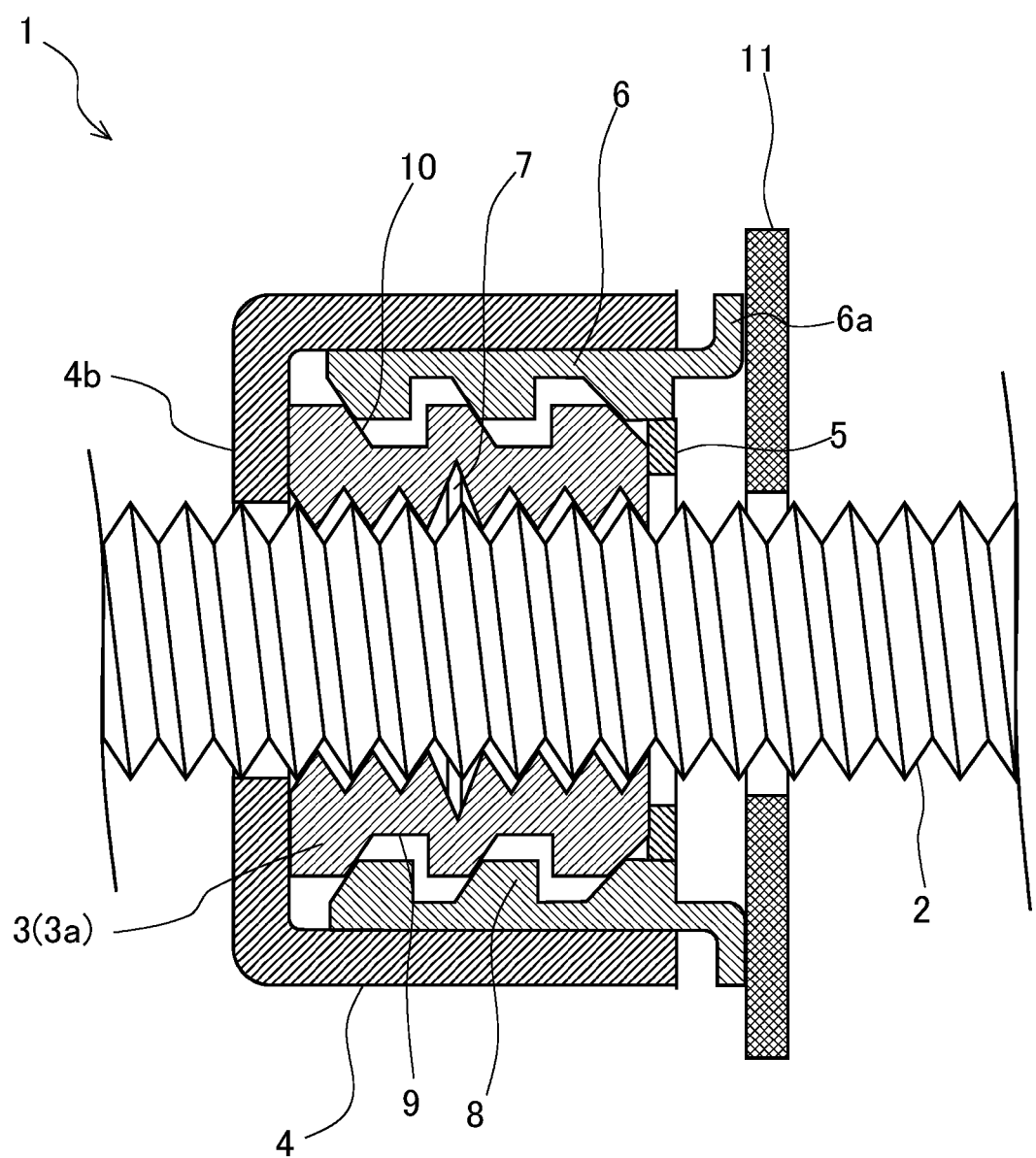
FIG. 4 is a schematic cross-sectional view of an intermediate state.

As illustrated in FIG. 4, when the nut 1 abuts against the member 11, the restraining plate 6a moves toward the one end portion of the outer cover 4 (toward the side where the stopper 4b is located) due to the member 11. At this time, the protrusions 8 move toward the stopper 4b along the slant surfaces 10 of the grooves 9. Accordingly, the nut main body 3 moves radially inward, and a state in which the threads of the nut main body 3 and the threads of the bolt 2 slightly mesh with each other is brought about. This state illustrated in FIG. 4 is defined as an intermediate state. The intermediate state is a state in which the protrusions 8 and the grooves 9 contact each other only through the slant surfaces 10 and the nut main body 3 contracts radially against the ring-shaped spring 7.

Figure 5:
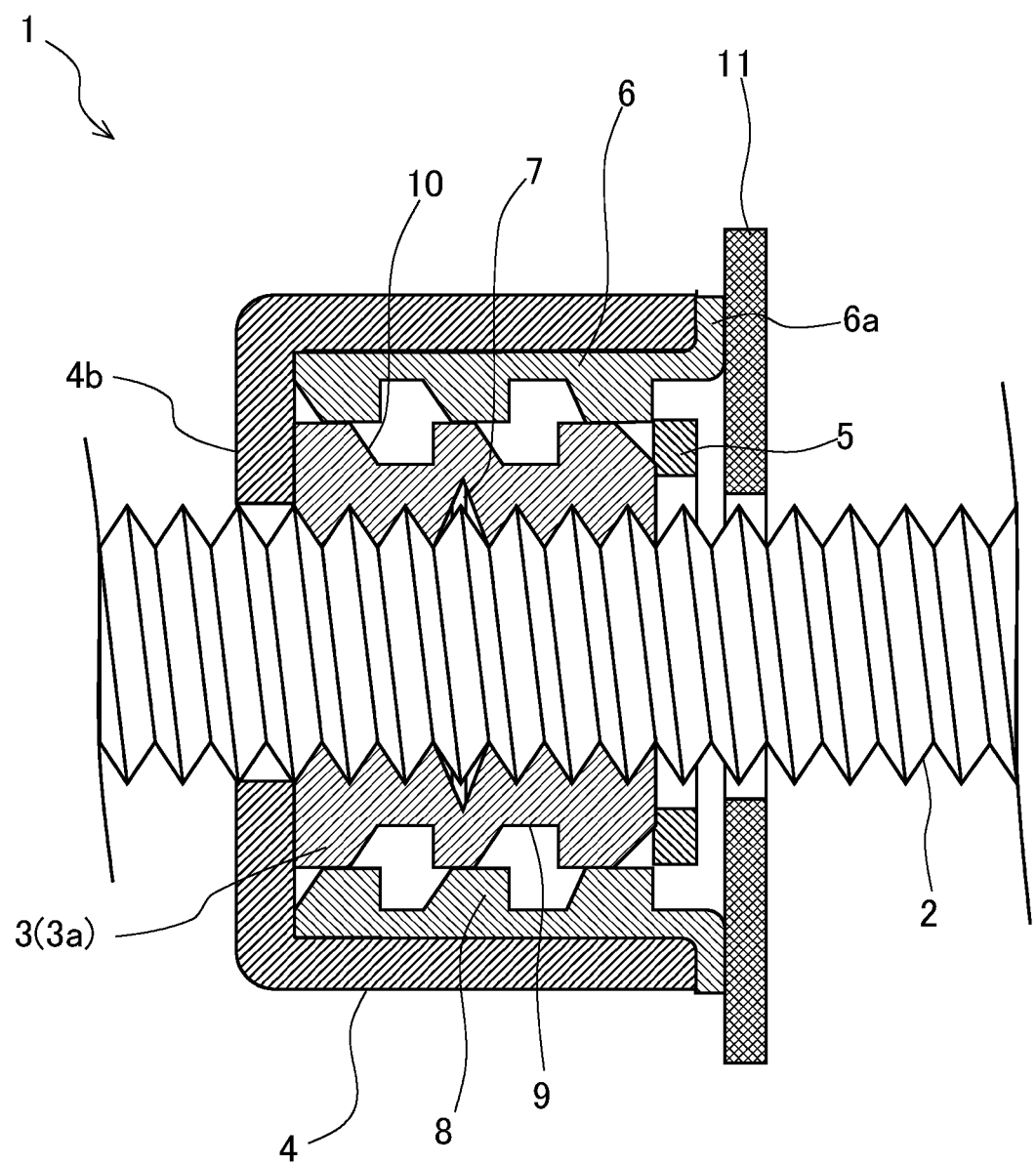
FIG. 5 is a schematic cross-sectional view of a fastened state.

As illustrated in FIG. 5, when the nut 1 is rotated while being pressed toward the member 11 further from the intermediate state, the threads of the bolt 2 and the nut main body 3 are screwed together and fastened together (rotate integrally due to frictional force resulting from the outer cover 4, the inner cover 6, and the nut main body 3 as a result of the nut 1 being pressed). At this time, the entirety of the protrusions 8 are outside the grooves 9, and leading ends of the protrusions 8 (the inner face side of the inner cover 6) is in abutment against the outer circumferential surface of the nut main body 3. Thus, the nut main body 3 contracts radially to the maximal extent. This state illustrated in FIG. 5 is defined as a fastened state in which the nut 1 is completely fixed onto the bolt 2. The fastened state is a state in which the leading ends of the protrusions 8 are in abutment against an outer wall surface of the nut main body 3 except for the grooves 9. At this time, the inner cover 6 is in abutment against the stopper 4b. In other words, the stopper 4b is restricting movement of the inner cover 6 in the axial direction.

As described above, a transition is made between the insertion state, the intermediate state, and the fastened state as a result of the inner cover 6 moving in the axial direction. Movement of the inner cover 6 results in the protrusions 8 entering and exiting the grooves 9 and hence in the radial expansion and contraction of the nut main body 3.

As has been stated above, according to the present invention, the nut main body 3 is biased by the ring-shaped spring 7 radially outward. Thus, the bolt 2 and the nut main body 3 do not interfere with each other when the bolt 2 is inserted through the nut 1. Accordingly, the nut 1 is freely movable along the bolt 2 bidirectionally and can be easily passed along the bolt 2 bidirectionally. When the nut 1 and the bolt 2 are to be fastened together, the protrusions 8 may be removed from the grooves 9 along the slant surface 10 and made to press against the outer wall surface of the nut main body 3 so that the nut 1 and the bolt 2 mesh with each other, and in this state, the nut 1 and the bolt 2 may simply be screwed together. Moreover, the transition between the insertion state, the intermediate state, and the fastened state can be made through mere movement of the inner cover 6, so the nut 1 and the bolt 2 can be inserted or passed relative to each other, as well as fastened together, easily by a simple operation. Consequently, work efficiency at a work site is improved and speedy work can be achieved.

REFERENCE SIGNS LIST

1: nut
2: bolt
3: nut main body
3a: nut segment
4: outer cover
4a: through-hole
4b: stopper
5: restraining ring
6: inner cover
6a: restraining plate
7: ring-shaped spring
8: protrusion
9: groove
10: slant surface
11: member

The invention claimed is:

1. A nut to be fastened onto a bolt, characterized in that the nut comprises:
a nut main body having a substantially cylindrical shape and constituted by a plurality of nut segments obtained through segmentation of the nut main body in a circumferential direction around an axis of the nut main body wherein the bolt is expected to be inserted along the axis;
an outer cover comprises a polygon base and a stopper that are configured to respectively cover an outer circumference and one end face of the nut main body;
a restraining ring configured to abut against the other end face of the nut main body for restricting movement of the nut main body in an axial direction in the outer cover while allowing the nut main body to only expand and contract in a radial direction in the outer cover;
an inner cover comprising a restraining plate at one end portion of the inner cover, the restraining plate being configured to restrict a position of the restraining ring, the inner cover being accommodated in the outer cover and configured to cover the outer circumference of the nut main body; and
a ring-shaped spring disposed on an inner wall of the nut main body and configured to bias the nut main body to cause the nut main body to expand radially toward an inner wall of the inner cover, wherein
a protrusion protruding in a circumferential direction is formed on the inner surface of the inner cover,
a groove is formed in a circumferential direction on an outer surface of the nut main body in a manner in which the groove is capable of engaging with the protrusion and accommodating the protrusion, and
the protrusion has a slant surface and the groove has a slant surface, the slant surfaces being configured to contact each other on the same side in the axial direction, wherein
the stopper of the outer cover has a through-hole of which an inner diameter is equal to or greater than an outer diameter of the bolt such that the bolt penetrates the stopper in the axial direction of the outer cover,
the polygon base has an outer shape that is polygon such that the polygon base fits in a tool such that the outer cover makes a rotation in either a clockwise or anti-clockwise direction by the tool,
the nut main body is arranged to be in one of three states of arrangement and is interchangeable to each of the other states as defined below:
an insertion state constituted by a state in which the nut main body is expanded radially by the ring-shaped spring and the protrusion and the groove are in engagement with each other,
an intermediate state constituted by a state in which the protrusion and the groove contact each other only through the slant surfaces and the nut main body contracts radially against the ring-shaped spring, and
a fastened state constituted by a state in which a leading end of the protrusion is in abutment against an outer wall surface of the nut main body except for the groove and the nut and the bolt are fastened together, and
a transition between the insertion state, the intermediate state, and the fastened state is made by moving the inner cover in the axial direction.

2. The nut of claim 1, characterized in that the outer shape of the polygon base is a regular hexagon.

* * * * *